US 11,414,954 B2

(12) United States Patent
Ahmari (10) Patent No.: US 11,414,954 B2
(45) Date of Patent: Aug. 16, 2022

(54) SMART CHOKE VALVE TO ASSESS AND REGULATE PRODUCTION FLOW (71) Applicant: Saudi Arabian Oil Company, Dhahran (SA)

(72) Inventor: Abdulrahman Ahmari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 189 days.

(21) Appl. No.: 16/921,548

(22) Filed: Jul. 6, 2020

(65) Prior Publication Data

US 2022/0003071 A1  Jan. 6, 2022

(51) Int. Cl.
*E21B 34/02* (2006.01)
*E21B 47/06* (2012.01)
(Continued)

(52) U.S. Cl.
CPC ............ *E21B 34/025* (2020.05); *E21B 34/08* (2013.01); *E21B 47/06* (2013.01); *E21B 47/07* (2020.05);
(Continued)

(58) Field of Classification Search
CPC ........ E21B 34/02; E21B 34/025; E21B 47/06; G05D 7/0623
See application file for complete search history.

(56) References Cited

U.S. PATENT DOCUMENTS 2,601,654 A   6/1952  Wright
4,630,675 A  12/1986  Neipling et al.
(Continued)

FOREIGN PATENT DOCUMENTS

CN   101289971 B   10/2008
CN   108825167 A   11/2018
(Continued)

OTHER PUBLICATIONS

Alajmi, Mohammed D. et al.; "Improving Multiphase Choke Performance Prediction and Well Production Test Validation Using Artificial Intelligence; A New Milestone" SPE-173394, SPE Digital Energy Conf. and Ex., the Woodlands, Mar. 3-5, 2015; pp. 1-9.
(Continued)

*Primary Examiner* — Matthew R Buck
(74) *Attorney, Agent, or Firm* — Bracewell LLP; Constance G. Rhebergen; Brian H. Tompkins (57) ABSTRACT Provided is a hydrocarbon well choke system that includes a choke valve and a choke control system adapted to obtain production data from production sensors of the well (e.g., including flowrate, wellhead pressure, wellhead temperature, water cut and gas-oil-ratio (GOR) data obtained by way of respective sensors of the well), generate (based on the data) a well profile that is indicative of the flow of production from the well for different settings of the valve, receive (from a well control system) a target production rate, determine (based on the well profile) whether the rate is obtainable, in response to determining that the rate is obtainable, determine (based on the well profile) a choke setting that corresponds to the rate, and control the choke valve to operate at the setting, and, in response to determining that the rate is not obtainable, communicate (to the well control system) a corresponding alert.

18 Claims, 4 Drawing Sheets

(51) Int. Cl.
*G05D 7/06* (2006.01)
*E21B 49/08* (2006.01)
*E21B 47/10* (2012.01)
*E21B 47/07* (2012.01)
*G05B 13/04* (2006.01)
*E21B 34/08* (2006.01)

(52) U.S. Cl.
CPC .......... *E21B 47/10* (2013.01); *E21B 49/0875* (2020.05); *G05B 13/04* (2013.01); *G05B 13/041* (2013.01); *G05D 7/0623* (2013.01); *Y10T 137/5983* (2015.04)

(56) References Cited

U.S. PATENT DOCUMENTS

| | | | |
|---|---|---|---|
| 6,814,142 B2 | 11/2004 | Paulk et al. | |
| 6,988,554 B2 | 1/2006 | Bodine et al. | |
| 9,268,057 B2 | 2/2016 | Abitrabi et al. | |
| 9,416,637 B2 | 8/2016 | Allouche | |
| 9,988,866 B2 * | 6/2018 | Cotten | E21B 21/106 |
| 10,047,578 B2 * | 8/2018 | Lovorn | E21B 21/10 |
| 11,162,353 B2 * | 11/2021 | Thiruvenkatanathan | E21B 47/06 |
| 2008/0154510 A1 * | 6/2008 | Scott | E21B 43/12 166/250.15 |
| 2008/0262736 A1 * | 10/2008 | Thigpen | E21B 43/128 702/9 |
| 2012/0330466 A1 * | 12/2012 | Rodger | E21B 34/02 700/282 |
| 2016/0298401 A1 | 10/2016 | Cotten et al. | |
| 2017/0044876 A1 * | 2/2017 | Romer | E21B 47/06 |
| 2018/0016897 A1 | 1/2018 | Willberg et al. | |
| 2018/0119540 A1 | 5/2018 | Boscan Castillo | |
| 2018/0240021 A1 | 8/2018 | Al-Harbi et al. | |
| 2018/0306693 A1 | 10/2018 | Nazari et al. | |
| 2018/0340416 A1 | 11/2018 | Nemoto et al. | |
| 2019/0033898 A1 * | 1/2019 | Shah | G01N 29/14 |
| 2019/0120044 A1 | 4/2019 | Langnes et al. | |
| 2020/0386073 A1 * | 12/2020 | Joubran | E21B 34/08 |

FOREIGN PATENT DOCUMENTS

| | | | |
|---|---|---|---|
| EP | 1381921 B1 | 1/2004 | |
| EP | 1585885 B1 | 10/2005 | |
| EP | 3336303 A2 | 6/2018 | |
| KR | 101902472 B1 | 11/2018 | |
| WO | 2008079799 A2 | 7/2008 | |
| WO | 2012134497 A1 | 10/2012 | |
| WO | 2016057645 A1 | 4/2016 | |
| WO | 2016118802 A1 | 7/2016 | |
| WO | WO-2016118802 A1 * | 7/2016 | ......... E21B 41/0092 |
| WO | 2019040639 A1 | 2/2019 | |
| WO | 2019110851 A1 | 6/2019 | |
| WO | 2019118656 A1 | 6/2019 | |

OTHER PUBLICATIONS

Elhaj, Murtada A. et al.; "Single Gas Flow Prediction Through Chokes Using Artificial Intelligence Techniques" SPE-177991-MS, SPE Saudi Arabia Section Annual Technical Symposium and Exhibition held in Al-Khobar, Apr. 21-23, 2015; pp. 1-14.

Elliott, Dave et al.; "Managed Pressure Drilling Erases the Lines" Oilfield Review, Spring 2011: 23, No. 1; pp. 14-23.

Khamis, Mohammad et al.; "Optimization of choke size for two-phase flow using artificial intelligence" Journal of Petroleum Exploration and Production Technology, Aug. 7, 2019; pp. 1-14.

MiSwaco; "Autochoke drilling choke" MiSwaco A Schlumberger Company, 2014, pp. 1-3.

Nauduri, Anantha Sarat Sagar; "Managed Pressure Drilling Candidate Selection—A Dissertation" Graduate Studies of Texas A&M University, May 2009; pp. 1-134.

Okon, Anietie N. et al.; "Neural Network Models for Predicting Wellhead Pressure-Flow Rate Relationship for Niger Delta Oil Wells" Journal of Scientific Research & Reports 12(1), 2016; pp. 1-14.

Weatherford; "PressurePro Control System—Empowering your onshore drilling operations with accessible and accurate pressure-management technology" 2017; pp. 1-8.

International Search Report and Written Opinion for International Application No. PCT/US2021/032289 (SA51458), dated Sep. 1, 2021; pp. 1-12.

* cited by examiner

SMART CHOKE VALVE TO ASSESS AND REGULATE PRODUCTION FLOW

FIELD

Embodiments relate generally to developing wells, and more particularly to choke valve systems regulating hydrocarbon production from hydrocarbon wells.

BACKGROUND

A well typically includes a wellbore (or a "borehole") that is drilled into the earth to provide access to a geologic formation that resides below the earth's surface (or a "subsurface formation"). A well may facilitate the extraction of natural resources, such as hydrocarbons and water, from a subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations.

Developing a well for hydrocarbon production typically involves several stages, including a drilling stage, a completion stage and a production stage. The drilling stage involves drilling a wellbore into a portion of the formation that is expected to contain hydrocarbons (often referred to as a "hydrocarbon reservoir" or a "reservoir"). The drilling process is often facilitated by a drilling rig that sits at the earth's surface and that facilitates drilling operations, such as operating a drill bit to cut the wellbore. The completion stage involves operations for making the well ready to produce hydrocarbons, such as installing casing, installing production tubing, installing valves for regulating production flow, or pumping substances into the well to fracture, clean or otherwise prepare the reservoir and well to produce hydrocarbons. The production stage involves producing hydrocarbons from the reservoir by way of the well. During the production stage, the drilling rig is normally replaced with a production tree that includes valves (e.g., including one or more choke valves) for use in regulating production flowrate and pressure. The production tree typically includes an outlet that is connected to a distribution network of midstream facilities, such as tanks, pipelines or transport vehicles that transport production from the well to downstream facilities, such as refineries or export terminals.

The various stages of developing a hydrocarbon well can include a variety of challenges that are addressed to successfully develop the well. For example, during production operations, a well operator typically controls the rate of production from the well to optimize the overall production of hydrocarbons from the reservoir. The rate of production may be varied based on a number of factors, such as physical characteristics of the wellbore, the formation and production, and operations of nearby wells.

SUMMARY

Controlling a hydrocarbon well's production rate can be an important aspect of effectively and efficiently developing a hydrocarbon well. For example, holding a well's production rate at a relatively high level for an extended period of time can increase a risk of premature well depletion, water breakthrough, or other complications. On the other hand, holding a well's production at relatively low level for an extended period of time can reduce production and increase a marginal cost of production. Accordingly, it can be important to monitor and regulate well production rates.

Provided are systems and methods for regulating production of a hydrocarbon well. In some embodiments, a smart choke valve system of a hydrocarbon well is operable to automatically collect production data for the well, generate profiles for the well based on the data, and self-adjust to maintain a production rate of the well at a desirable level. For example, a control system of a smart choke valve system of a hydrocarbon well may collect production data directly from productions sensors (e.g., flowrate, pressure, temperature, water cut and gas-oil-ratio (GOR) data for production fluid of the well obtained from respective flowrate, pressure, temperature, water cut and GOR sensors of the well), process the production data (e.g., using Artificial Neural Network (ANN) processing) to generate corresponding well profiles for the well (e.g., including well rate-pressure and well pressure-choke profiles for the well), identify a target production parameter for the well (e.g., a target production rate communicated to the control system of the smart choke valve system from a well control system), determine a choke setting that corresponds to the target production parameter based on the well profiles for the well (e.g., determine a choke setting that corresponds the target production rate based on the well profiles for the well), and control a choke valve of the smart choke valve system to operate at the choke setting. This may enable the choke valve system to make timely adjustments to regulate production fluid flow in an effort to satisfy target operating parameters, such as a target production rate.

In some embodiments, the choke valve control system is operable to identify issues with observed production parameters and to communicate corresponding alerts to an operator of the well. For example, the choke valve control system may assess collected production data to determine whether one or more production parameters have deviated from normal (e.g., the value for a given parameter for a given point in time deviates more than a threshold percentage from its average of a given period of time) and, in response to determining that a production parameter has deviated from normal, send, to a well control system, a corresponding observed parameter alert that is indicative of the production parameter having deviated from normal.

In some embodiments, the choke valve control system is operable to identify issues with predicted production parameters and to communicate corresponding alerts to the well control an operator of the well. For example, the choke valve control system may assess a well profile of the well that is associated with a current set of well conditions to determine whether the current target production rate is attainable and, in response to determining that the current target production rate is not attainable (e.g., because the target production rate exceeds the current or predicted maximum production rate of the well), send, to a well control system, a corresponding target parameter alert that is indicative of the current target production rate not being attainable (e.g., now or in the future).

Provided in some embodiments is a hydrocarbon well choke valve system that includes the following: a choke valve adapted to operate at different choke settings to regulate flow of production fluid from a wellbore of a hydrocarbon well; and a choke valve control system adapted to perform the following operations: obtain, from one or more production sensors of the hydrocarbon well, production data that is indicative of characteristics of the operation of the hydrocarbon well, the production data including: production flowrate data that is indicative of observed values of flowrate of the production fluid obtained by way of a production flowrate sensor of the hydrocarbon well; wellhead pressure data that is indicative of observed values of pressure of the production fluid obtained by way of an wellhead pressure sensor of the hydrocarbon well; wellhead temperature data that is indicative of observed values of temperature of the production fluid obtained by way of a wellhead temperature sensor of the hydrocarbon well; water cut data that is indicative of observed values of water cut of the production fluid of the hydrocarbon well obtained by way of a water cut sensor of the hydrocarbon well; and GOR data that is indicative of observed values of GOR of the production fluid obtained by way of a GOR sensor of the hydrocarbon well; generate, based on the production data, a well profile that is indicative of the flow of production fluid from the wellbore of the hydrocarbon well for each of the different choke settings; receive, from a well control system, a target production rate; determine, based on the well profile for the well, whether the target production rate is obtainable; in response to determining that the target production rate is obtainable: determine, based on the well profile, a choke setting that corresponds to the target production rate; and control the choke valve to operate at the choke setting; and in response to determining that the target production rate is not obtainable, communicate, to the well control system, a target rate alert that indicates that the target rate is not obtainable.

In some embodiments, the well profile includes: a well rate-pressure profile that is indicative of a relationship of wellhead pressure of the hydrocarbon well to production rate of the hydrocarbon well; and a well pressure-choke profile that is indicative of a relationship of the different choke valve settings to wellhead pressure of the hydrocarbon well, and determining the choke setting that corresponds to the target production rate includes: determining, based on the well rate-pressure profile, a target wellhead pressure that corresponds to the target production rate; and determining, based on the well pressure-choke profile, the choke valve setting that corresponds to the target wellhead pressure. In certain embodiments, the operations further include: in response to determining that the target production rate is not obtainable: determine, based on the well profile, a closest choke setting that corresponds to the target production rate; and control the choke valve to operate at the closest choke setting. In some embodiments, the operations further include: determine, based on the production data, whether an observed production parameter for the well has deviated from historical production parameters for the well; and in response to determining that an observed production parameter for the well has deviated from historical production parameters for the well, communicate, to the well control system, a production parameter alert that indicates that the observed production parameter for the well has deviated from historical production parameters for the well. In some embodiments, the choke valve control system includes a local memory, and the well profile is stored on the local memory. In certain embodiments, the operations further include: communicate, to the well control system, the well profile. In some embodiments, the production data is obtained during operation of the hydrocarbon well and the choke valve is operated in real-time responsive to the obtaining of the production data.

Provided in some embodiments is a method of operating a hydrocarbon well choke valve system that includes the following: operating a choke valve of a hydrocarbon well choke valve system at a choke setting to regulate flow of production fluid from a wellbore of a hydrocarbon well, where the choke valve is adapted to operate at different choke settings; obtaining, by a control system of the hydrocarbon well choke valve system from one or more production sensors of the hydrocarbon well, production data that is indicative of characteristics of the operation of the hydrocarbon well, the production data including: production flowrate data that is indicative of observed values of flowrate of the production fluid obtained by way of a production flowrate sensor of the hydrocarbon well; wellhead pressure data that is indicative of observed values of pressure of the production fluid obtained by way of an wellhead pressure sensor of the hydrocarbon well; wellhead temperature data that is indicative of observed values of temperature of the production fluid obtained by way of a wellhead temperature sensor of the hydrocarbon well; water cut data that is indicative of observed values of water cut of the production fluid of the hydrocarbon well obtained by way of a water cut sensor of the hydrocarbon well; and GOR data that is indicative of observed values of GOR of the production fluid obtained by way of a GOR sensor of the hydrocarbon well; generating, by the choke valve control system based on the production data, a well profile, the well profile being indicative of the flow of production fluid from the wellbore of the hydrocarbon well for each of the different choke settings; receiving, by the choke valve control system from a well control system, a first target production rate; determining, by the choke valve control system based on the well profile for the well, that the first target production rate is obtainable; in response to the choke valve control system determining that the first target production rate is obtainable: determining, by the choke valve control system based on the well profile, a choke setting that corresponds to the first target production rate; and controlling, by the choke valve control system, the choke valve to operate at the first choke setting; receiving, by the choke valve control system from the well control system, a second target production rate; determining, by the choke valve control system based on the well profile for the well, that the second target production rate is not obtainable; and in response to the choke valve control system determining that the second target production rate is not obtainable: communicating, by the choke valve control system to the well control system, a target rate alert that indicates that the second target rate is not obtainable.

In some embodiments, the well profile includes: a well rate-pressure profile that is indicative of a relationship of wellhead pressure of the hydrocarbon well to production rate of the hydrocarbon well; and a well pressure-choke profile that is indicative of a relationship of the different choke valve settings to wellhead pressure of the hydrocarbon well, and determining the choke setting that corresponds to the target production rate includes: determining, based on the well rate-pressure profile, a target wellhead pressure that corresponds to the target production rate; and determining, based on the well pressure-choke profile, the choke valve setting that corresponds to the target wellhead pressure. In certain embodiments, the method further includes: in response to determining that the target production rate is not obtainable: determining, by the choke valve control system based on the well profile, a closest choke setting that corresponds to the target production rate; and controlling, by the choke valve control system, the choke valve to operate at the closest choke setting. In some embodiments, the method further includes: determining, by the choke valve control system based on the production data, that an observed production parameter for the well has deviated from historical production parameters for the well; and in response to the choke valve control system determining that an observed production parameter for the well has deviated from historical production parameters for the well, communicating, by the control system to the well control system, a production parameter alert that indicates that the observed production parameter for the well has deviated from historical production parameters for the well. In certain embodiments, the choke valve control system includes a local memory, and the method further includes the choke valve control system storing the well profile on the local memory. In certain embodiments, the method further includes the choke valve control system communicating the well profile to the well control system. In some embodiments, the production data is obtained during operation of the hydrocarbon well and the choke valve is operated in real-time responsive to the obtaining of the production data.

Provided in some embodiments is a non-transitory computer readable storage medium having program instructions stored thereon that are executable by a processor to perform the following operations for operating a hydrocarbon well choke valve system: operating a choke valve of a hydrocarbon well choke valve system at a choke setting to regulate flow of production fluid from a wellbore of a hydrocarbon well, where the choke valve is adapted to operate at different choke settings; obtaining, by a control system of the hydrocarbon well choke valve system from one or more production sensors of the hydrocarbon well, production data that is indicative of characteristics of the operation of the hydrocarbon well, the production data including: production flowrate data that is indicative of observed values of flowrate of the production fluid obtained by way of a production flowrate sensor of the hydrocarbon well; wellhead pressure data that is indicative of observed values of pressure of the production fluid obtained by way of an wellhead pressure sensor of the hydrocarbon well; wellhead temperature data that is indicative of observed values of temperature of the production fluid obtained by way of a wellhead temperature sensor of the hydrocarbon well; water cut data that is indicative of observed values of water cut of the production fluid of the hydrocarbon well obtained by way of a water cut sensor of the hydrocarbon well; and GOR data that is indicative of observed values of GOR of the production fluid obtained by way of a GOR sensor of the hydrocarbon well; generating, by the choke valve control system based on the production data, a well profile, the well profile being indicative of the flow of production fluid from the wellbore of the hydrocarbon well for each of the different choke settings; receiving, by the choke valve control system from a well control system, a first target production rate; determining, by the choke valve control system based on the well profile for the well, that the first target production rate is obtainable; in response to the choke valve control system determining that the first target production rate is obtainable: determining, by the choke valve control system based on the well profile, a choke setting that corresponds to the first target production rate; and controlling, by the choke valve control system, the choke valve to operate at the first choke setting; receiving, by the choke valve control system from the well control system, a second target production rate; determining, by the choke valve control system based on the well profile for the well, that the second target production rate is not obtainable; and in response to the choke valve control system determining that the second target production rate is not obtainable: communicating, by the choke valve control system to the well control system, a target rate alert that indicates that the second target rate is not obtainable.

In some embodiments, the well profile includes: a well rate-pressure profile that is indicative of a relationship of wellhead pressure of the hydrocarbon well to production rate of the hydrocarbon well; and a well pressure-choke profile that is indicative of a relationship of the different choke valve settings to wellhead pressure of the hydrocarbon well, and determining the choke setting that corresponds to the target production rate includes: determining, based on the well rate-pressure profile, a target wellhead pressure that corresponds to the target production rate; and determining, based on the well pressure-choke profile, the choke valve setting that corresponds to the target wellhead pressure. In certain embodiments, the operations further include: in response to determining that the target production rate is not obtainable: determining, by the choke valve control system based on the well profile, a closest choke setting that corresponds to the target production rate; and controlling, by the choke valve control system, the choke valve to operate at the closest choke setting. In some embodiments, the operations further include: determining, by the choke valve control system based on the production data, that an observed production parameter for the well has deviated from historical production parameters for the well; and in response to the choke valve control system determining that an observed production parameter for the well has deviated from historical production parameters for the well, communicating, by the control system to the well control system, a production parameter alert that indicates that the observed production parameter for the well has deviated from historical production parameters for the well. In certain embodiments, the choke valve control system includes a local memory, and where the operations further include the choke valve control system storing the well profile on the local memory. In some embodiments, the operations further include the choke valve control system communicating the well profile to the well control system. In certain embodiments, the production data is obtained during operation of the hydrocarbon well and the choke valve is operated in real-time responsive to the obtaining of the production data.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for regulating production of a hydrocarbon well. In some embodiments, a smart choke valve system of a hydrocarbon well is operable to automatically collect production data for the well, generate profiles for the well based on the data, and self-adjust to maintain a production rate of the well at a desirable level. For example, a control system of a smart choke valve system of a hydrocarbon well may collect production data directly from productions sensors (e.g., flowrate, pressure, temperature, water cut and gas-oil-ratio (GOR) data for production fluid of the well obtained from respective flowrate, pressure, temperature, water cut and GOR sensors of the well), process the production data (e.g., using Artificial Neural Network (ANN) processing) to generate corresponding well profiles for the well (e.g., including well rate-pressure and well pressure-choke profiles for the well), identify a target production parameter for the well (e.g., a target production rate communicated to the control system of the smart choke valve system from a well control system), determine a choke setting that corresponds to the target production parameter based on the well profiles for the well (e.g., determine a choke setting that corresponds the target production rate based on the well profiles for the well), and control a choke valve of the smart choke valve system to operate at the choke setting. This may enable the choke valve system to make timely adjustments to regulate production fluid flow in an effort to satisfy target operating parameters, such as a target production rate.

In some embodiments, the choke valve control system is operable to identify issues with observed production parameters and to communicate corresponding alerts to an operator of the well. For example, the choke valve control system may assess collected production data to determine whether one or more production parameters have deviated from normal (e.g., the value for a given parameter for a given point in time deviates more than a threshold percentage from its average of a given period of time) and, in response to determining that a production parameter has deviated from normal, send, to a well control system, a corresponding observed parameter alert that is indicative of the production parameter having deviated from normal.

In some embodiments, the choke valve control system is operable to identify issues with predicted production parameters and to communicate corresponding alerts to the well control an operator of the well. For example, the choke valve control system may assess a well profile of the well that is associated with a current set of well conditions to determine whether the current target production rate is attainable and, in response to determining that the current target production rate is not attainable (e.g., because the target production rate exceeds the current or predicted maximum production rate of the well), send, to a well control system, a corresponding target parameter alert that is indicative of the current target production rate not being attainable (e.g., now or in the future).

Figure 1:
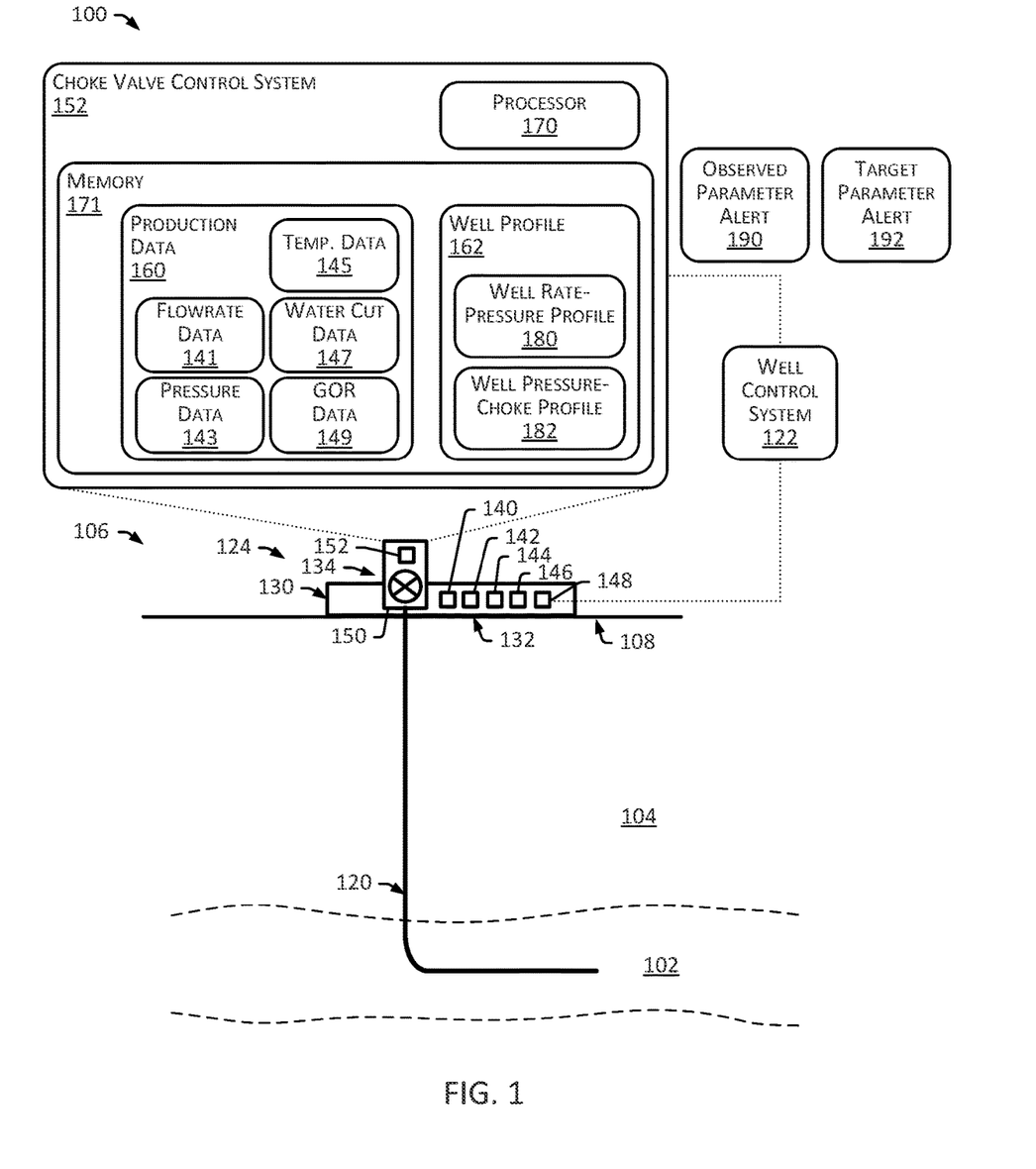
FIG. 1 is diagram that illustrates a well environment in accordance with one or more embodiments.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well") 106.

The formation 104 may include a porous or fractured rock formation that resides beneath the Earth's surface (or "surface") 108. The reservoir 102 may be a hydrocarbon reservoir defined by a portion of the formation 104 that contains (or that is determined or expected to contain) a subsurface pool of hydrocarbons, such as oil and gas. The formation 104 and the reservoir 102 may each include different layers of rock having varying characteristics, such as varying degrees of permeability, porosity, and fluid saturation. In the case of the well 106 being operated as a production well, the well 106 may be a hydrocarbon production well that is operable to facilitate the extraction of hydrocarbons (or "production fluid" or "production") from the reservoir 102.

The well 106 may include a wellbore 120, a well control system ("control system") 122, and a production system 124. The wellbore 120 may be, for example, a bored hole that extends from the surface 108 into a target zone of the formation 104, such as the reservoir 102. The wellbore 120 may be created, for example, by a drill bit boring through the formation 104. An upper end of the wellbore 120 (e.g., located at or near the surface 108) may be referred to as the "up-hole" end of the wellbore 120. A lower end of the wellbore 120 (e.g., terminating in the formation 104) may be referred to as the "down-hole" end of the wellbore 120.

In some embodiments, the well control system 122 is operable to control various operations of the well 106, such as well drilling operations, well completion operations, well production operations, or well monitoring operations. For example, the well control system 122 may include a well system memory and a well system processor that are operable to perform some or all of the various processing and control operations of the well control system 122 described here. In some embodiments, the well control system 122 includes a supervisory control and data acquisition (SCADA) computer system that is operable to monitor well devices. For example, the well control system 122 may include SCADA computer system that is operable to monitor measurements obtained by way of production sensors, monitor well profiles provided by the choke valve system 134, monitor alerts provided by the choke valve system 134, to process some or all of the measurements, well profiles and alerts to identify a corresponding operation of the choke valve system 134, and to issue, to the choke valve system 134, corresponding commands for controlling operation of the choke valve 150 in accordance with the identified operation. In some embodiments, the well control system 122 includes a computer system that is the same as or similar to that of computer system 1000 described with regard to at least FIG. 5.

In some embodiments, the production system 124 includes devices that facilitate that extraction of production from the reservoir 102 by way of the wellbore 120. For example, in the illustrated embodiment, the production system 124 includes a wellhead 130, production sensors 132 and a smart choke valve system ("choke valve system") 134 that are operable to regulate the flow of production from the wellbore 120.

In some embodiments, the production sensors 132 are operable to monitor various characteristics (or "parameters") of the production fluid produced by way of the well 106. The production sensors 132 may include a production flowrate sensor 140 that is operable to sense the flowrate of production fluid in the wellbore 120, and to generate corresponding production flowrate data 141. The production flowrate sensor 140 may be, for example, a flowmeter (e.g., a surface flowmeter located at the wellhead 130 of the well 106) that measures the flowrate of production exiting the wellbore 120. The flowrate of production may be referred to as the "production rate" (or "flowrate") of the well 106. In some embodiments, the production flowrate data 141 includes a set of flowrate measurements that are indicative of observed values of flowrate of the production fluid in the wellbore 120 across a time interval. For example, the production flowrate data 141 may include a set of time series flowrate measurements obtained by way of the production flowrate sensor 140 that are indicative of observed values of flowrate of the production fluid in the wellbore 120 at or near the wellhead of the well 106, at respective instances of time across a given time interval.

The production sensors 132 may include a pressure sensor 142 that is operable to sense the pressure of production fluid in the wellbore 120 of the well 106, and to generate corresponding pressure data 143. The pressure sensor 142 may be, for example, a surface pressure sensor that measures the pressure of production fluid in the up-hole end of the wellbore 120 (e.g., a wellhead pressure sensor that measures wellhead pressure (WHP), $P_{wh}$, of the well 106), or a down-hole pressure sensor that measures the pressure of production fluid in a lower portion of the wellbore 120 (e.g., a bottom hole pressure sensor that measures bottom hole pressure (BHP), $P_{bh}$, of the well 106). The measured pressure of the wellbore 120 may be referred to as the "pressure" of the well 106. In some embodiments, the pressure data 143 includes a set of pressure measurements that are indicative of observed values of well pressure of the well 106 at respective instances of time across a time interval. For example, the pressure data 143 may include a set of time series wellhead pressure measurements (e.g., obtained by way of a wellhead type pressure sensor 142) that are indicative of observed values of the wellhead pressure of production fluid in the wellbore 120 at or near the wellhead 130 of the well 106, at respective instances of time across the given time interval.

The production sensors 132 may include a temperature sensor 144 that is operable to sense the temperature of production fluid in the wellbore 120, and to generate corresponding temperature data 145. The temperature sensor 144 may be, for example, a surface temperature sensor that measures the temperature of production fluid in the up-hole end of the wellbore 120 (e.g., a wellhead temperature sensor that measures wellhead temperature (WHT), $T_{wh}$, of the well 106), or a down-hole temperature sensor that measures the temperature of production fluid in a lower portion of the wellbore 120 (e.g., a bottom hole temperature sensor that measures bottom hole temperature (BHT), $T_{bh}$, of the well 106). The measured temperature of the wellbore 120 may be referred to as the "well temperature" of the well 106. In some embodiments, the temperature data 145 includes a set of temperature measurements that are indicative of observed values of well temperature of the well 106 at respective instances of time across a time interval. For example, the temperature data 145 may include a set of time series wellhead temperature measurements (e.g., obtained by way of a wellhead type temperature sensor 144) that are indicative of observed values of the temperature of production fluid in the wellbore 120 at or near the wellhead 130 of the well 106, at respective instances of time across the given time interval.

The production sensors 132 may include a water cut sensor 146 that is operable to sense the water content of production fluid produced by the well 106, and to generate corresponding water cut data 147. Water cut of production fluid may be defined as a ratio of the volume of water in production fluid to the total volume of liquids in the production fluid. In some embodiments, the water cut data 147 includes a set of measurements that are indicative of observed values of the water cut of production fluid produced by the well 106 at respective instances of time across a time interval. For example, the water cut data 147 may include a set of time series measurements (e.g., obtained by way of the water cut sensor 146) that are indicative of observed values of the water cut of production fluid produced by the well 106 at respective instances of time across the given time interval.

The production sensors 132 may include a gas-oil-ratio (GOR) sensor 148 that is operable to sense the gas/oil ratio (GOR) of production fluid produced by the well 106, and to generate corresponding gas-oil-ratio (GOR) data 149. Gas/oil ratio (GOR) of production fluid may be defined as the ratio of the volume of gas to oil within the production fluid. In some embodiments, the GOR data 149 includes a set of measurements that are indicative of observed values of the GOR of production fluid produced by the well 106 at respective instances of time across a time interval. For example, the GOR data 149 may include a set of time series measurements (e.g., obtained by way of the GOR sensor 148) that are indicative of observed values of the GOR of production fluid produced by the well 106 at respective instances of time across the given time interval.

In some embodiments, the choke valve system 134 is operable to regulate the flow of production fluid from the wellbore 120. For example, the choke valve system 134 may be operated to increase, decrease, or maintain, the flow of production fluid advancing up the wellbore 120 of the well 106. This may enable a well operator to regulate the flowrate and pressure of production fluids produced from the reservoir 102 to effectively and efficiently develop the hydrocarbon well 106.

In some embodiments, the choke valve system 134 includes a choke valve 150 and a choke valve control system 152. In some embodiments, the choke valve 150 includes a valve mechanism that is operable in different choke positions (or "settings" or "states") to regulate the flow of production through the choke valve system 134. For example, the choke valve 150 may be operable to actuate between a fully-opened position and fully-closed position. The fully-opened position may, for example, include opening an entire flow area of the choke valve 150 to facilitate the flow of substances, such as production fluid, across the choke valve 150. The fully-closed position may include closing the entire flow area of the choke valve 150 to fully inhibit (or "block") the flow of substances across the choke valve 150. The choke valve 150 may have one or more partially-opened positions that can be utilized to regulate (or "choke") the flow of substances through the choke valve 150. For example, the choke valve 150 may have eleven positions (or "states" or "settings"), 0-10, with position 0 being a 0% open position (or a "fully-closed" position), each of positions 1-9 providing sequentially increasing degrees of opening of the flow area of the choke valve 150, and state 10 being a 100% open position (or a "fully-opened" position). As described, the operational position of the choke valve 150 may be dictated by a variety of factors, such as a desired production rate and observed characteristic of production of the well 106.

In some embodiments, the choke valve control system 152 controls operation of the choke valve 150. For example, the choke valve control system 152 may control operation of a mechanical actuator that sets the choke valve 150 in a given position. The choke valve control system 152 may include a local choke valve control system processor 170 and a local choke valve control system memory 171 that are operable to perform some or all of the various processing and control operations of the choke valve control system 152 described here. In some embodiments, the choke valve control system 152 includes a computer system that is the same as or similar to that of computer system 1000 described with regard to at least FIG. 5. In some embodiments, the choke valve system 134 is a unitary system that includes the choke valve 150 and the choke valve control system 152. For example, the choke valve system 134 may include a "choke unit" that is installed as a component of a production tree that is coupled to the wellhead 130 of the well 106.

In some embodiments, the choke valve control system 152 is operable to collect and assess production data 160, and to automatically control operation of the choke valve 150 based on the assessment of the production data 160. For example, the choke valve control system 152 may obtain production data 160 for the well 106, process the production data 160 for the well 106 to generate a well profile 162 for the well 106, determine a corresponding operational state of the choke valve 150 based on the well profile 162, and control the choke valve 150 to operate in the operational state. In some embodiments, the collection, assessment and control is performed locally, by the processor 170 of the choke valve control system 152. Such local processing and control may enable the choke valve system 134 to collect and respond to production parameters in real-time (e.g., within one minute of the measurement of the corresponding production data).

In some embodiments, the production data 160 includes production flowrate data 141, pressure data 143, temperature data 145, water cut data 147 and GOR data 149. For example, the choke valve control system 152 may collect production data 160 that includes production flowrate data 141, pressure data 143, temperature data 145, water cut data 147 and GOR data 149 collected from the production flowrate sensor 140, the pressure sensor 142, the temperature sensor 144, the water cut sensor 146, and the GOR sensor 148, respectively, and store the collected production data 160 in the memory 171 of the choke valve control system 152. In some embodiments, some or all of the production data 160 is collected independent of the well control system 122. For example, the production data 160 may be communicated from the respective production sensors 132 to the choke valve control system 152, without the data passing through the well control system 122. This may facilitate the choke valve control system 152 receiving the production data 160 in real-time (e.g., within 1 minute of corresponding measurements), which can, in turn, enable the choke valve control system 152 to make real-time assessments of the production data 160 (e.g., within 1 minute of corresponding measurements) and impart real-time control of the choke valve 150 (e.g., within 1 minute of corresponding measurements).

In some embodiments, the well profile 162 for the well 106 is indicative of production flowrates for the well 106 and corresponding settings of the choke valve 150. For example, the well profile 162 may include, for each combination of associated well conditions (e.g., for each combination of possible well-pressures, well temperatures, water cuts and GORs), a mapping that indicates an estimated flowrate of the well 106 at each of the 11 different settings (e.g., settings 0-10) of the choke valve 150.

Figure 2:
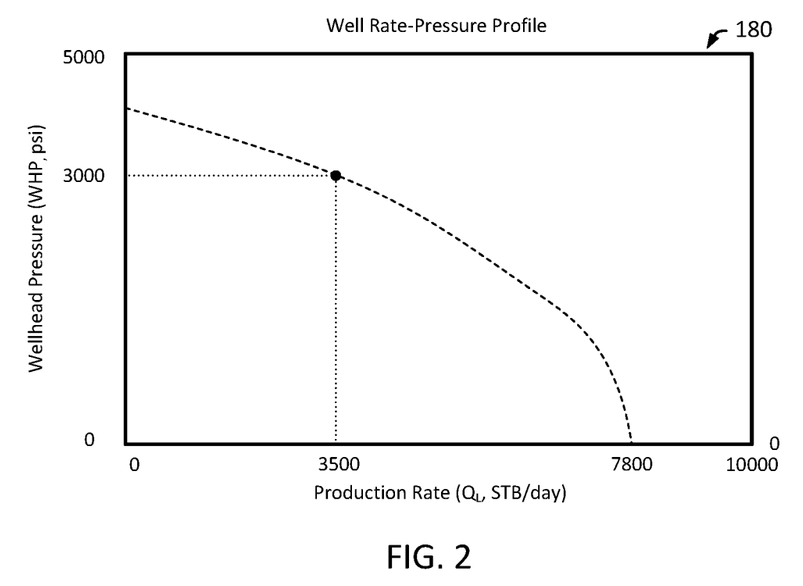
FIG. 2 is a diagram that illustrates an example well rate-pressure profile in accordance with one or more embodiments.
Figure 3:
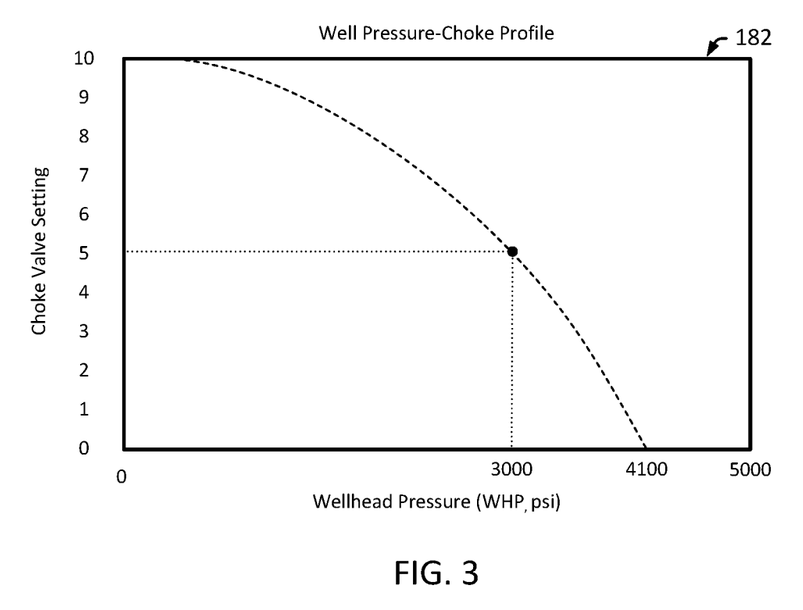
FIG. 3 is a diagram that illustrates an example well pressure-choke profile in accordance with one or more embodiments.

In some embodiments, the well profile 162 for the well 106 includes a well rate-pressure profile 180 or a well pressure-choke profile 182. The well rate-pressure profile 180 may be indicative of a relationship of pressure to production rate of the well 106. The well pressure-choke profile 182 may be indicative of a relationship of settings of the choke valve 150 to well pressure of the well 106. FIG. 2 is a diagram that illustrates an example well rate-pressure profile 180 in accordance with one or more embodiments. FIG. 3 is a diagram that illustrates an example well pressure-choke profile 182 in accordance with one or more embodiments. Each of the illustrated profiles 180 and 182 may be associated with a given combination of associated well conditions (e.g., a given combination of WHP, WHT, water cut, and GOR). In such an embodiment, given a target production rate for the well 106 (and in response to a determination that the well is operating at the well conditions associated with the illustrated profiles 180 and 182), the well rate-pressure profile 180 may be employed to determine a WHP that corresponds to the given target production rate, and the well pressure-choke profile 182 may be employed to determine a choke valve setting that corresponds to the determined WHP. For example, in response to the choke valve control system 152 receiving a command to operate at a production flowrate ($Q_L$) of 3,500 STB/day from the well control system 122, and the choke valve control system 152 determining that the well is operating at the well conditions associated with the illustrated profiles 180 and 182, the choke valve control system 152 may determine, using the well rate-pressure profile 180 of FIG. 2, a WHP of 3,000 psi that corresponds to a production flowrate ($Q_L$) of 3,500 STB/day, and the choke valve control system 152 may determine, using the well pressure-choke profile 182 of FIG. 3, a choke valve setting of 5 that corresponds to the determined WHP of 3,000 psi.

In some embodiments, the well profile 162 is generated using an artificial neural network (ANN). For example, the production data 160 received by the choke valve control system 152 may be input to an ANN that identifies patterns in the production data 160 and generates corresponding well rate-pressure profiles 180 and well pressure-choke profiles 182 for some or all of the possible sets/combinations of well conditions. In some embodiments, the ANN employs a suitable training function. For example, the ANN may employ a Levenberg Marquardt training function. In some embodiments, the ANN employs one or more hidden layers. For example, the ANN may employ 1, 2, 3, or more hidden layers. In some embodiments, the output of the ANN is the well profile 162 for the well 106. For example, the ANN may output a well profile 162 for the well 106 includes a well rate-pressure profile 180 and a well pressure-choke profile 182 for each of some or all of the possible sets/combinations of well conditions.

In some embodiments, the choke valve control system 152 is operable to identify issues with observed production parameters, and to communicate corresponding alerts to the well control system 122, or another operator of the well. In some embodiments, the alerts include a production parameter alert that is indicative of observed production parameters deviating from normal by more than expected amount. For example, the choke valve control system 152 may assess collected production data 160 to determine whether one or more production parameters have deviated from normal (e.g., the value of a given parameter for a given point in time deviates more than 10% from its average for the one hour preceding the given point in time) and, in response to determining that a production parameter have deviated from normal, send, to the well control system 122, a corresponding observed parameter alert 190 that is indicative of the production parameter having deviated from normal.

In some embodiments, the choke valve control system 152 is operable to identify issues with predicted production parameters, and to communicate corresponding alerts to the well control system 122, or another operator of the well. In some embodiments, the alerts include a production parameter target alert that is indicative of a prediction that a target production parameter is not attainable. For example, the choke valve control system 152 may assess the well profiles 162 associated with a current set of well conditions to determine whether the current target production rate is attainable, and, in response to determining that the current target production rate is not attainable (e.g., because the target production rate exceeds the maximum production rate of the well rate-pressure profile 180 or the WHP corresponding to the target production rate exceeds maximum WHP of the well pressure-choke profile 182), send, to the well control system 122, a corresponding target parameter alert 192 that indicates that the current target production rate is not attainable.

Figure 4:
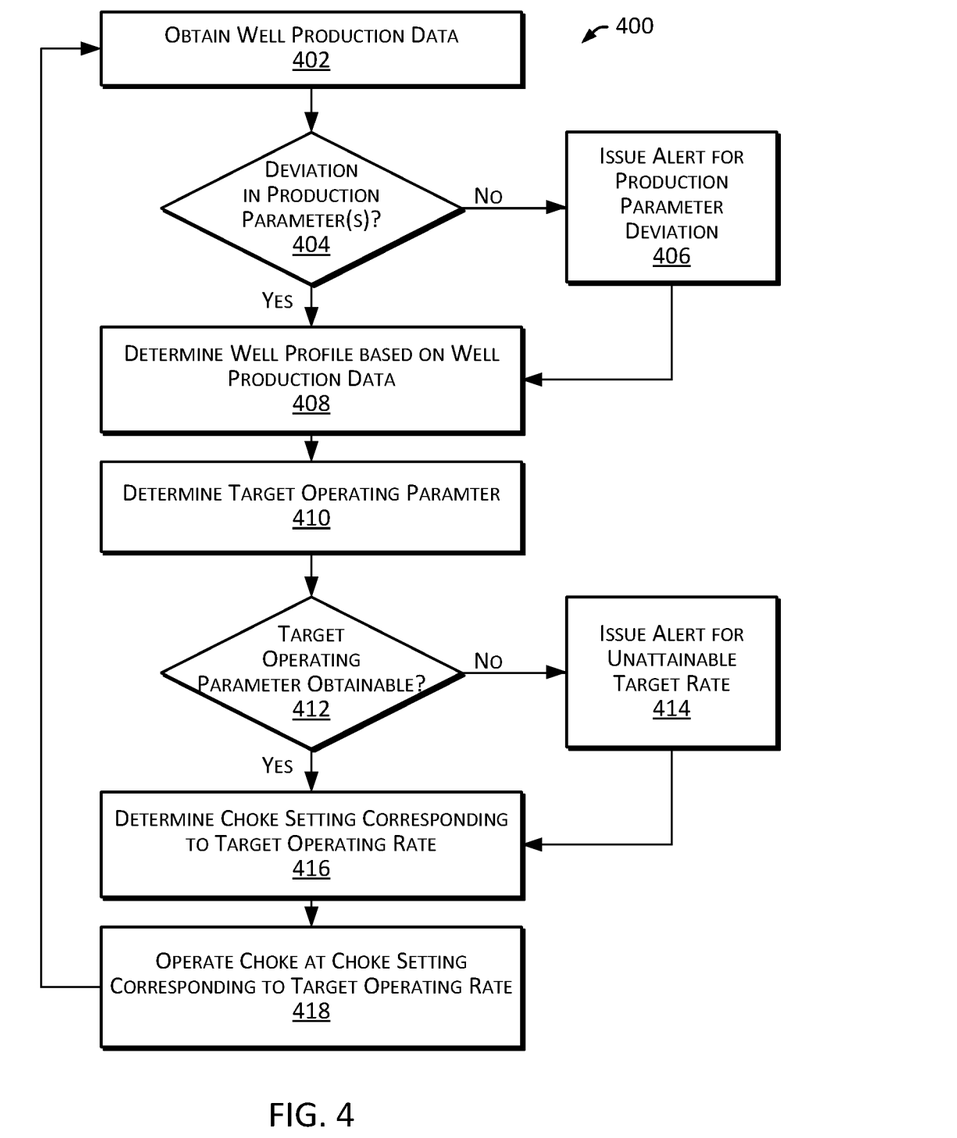
FIG. 4 is a flowchart that illustrates a method of operating a hydrocarbon well choke valve system in accordance with one or more embodiments.

FIG. 4 is a flowchart that illustrates a method 400 of operating a hydrocarbon well choke valve system in accordance with one or more embodiments. In the context of the well 106, some or all of the operations of method 400 may be performed, for example, by the choke valve control system 152.

In some embodiments, method 400 includes obtaining well production data (block 402). This may include a choke valve system obtaining well production data that is indicative of observed operating parameters for a well. For example, obtaining well production data may include the choke valve control system 152 obtaining, from the production sensors 132, production data 160 that is indicative of observed operating parameters for the well 106 over a given period of time. This may include the choke valve control system 152 obtaining production flowrate data 141, pressure data 143, temperature data 145, water cut data 147 and GOR data 149 collected from the production flowrate sensor 140, the pressure sensor 142, the temperature sensor 144, the water cut sensor 146, and the GOR sensor 148, respectively, and storing the collected production data 160 in the local memory 171 of the choke valve control system 152.

In some embodiments, method 400 includes determining whether a deviation in production parameters has occurred (block 404). This may include determining whether one or more observed production parameters for the well have deviated from normal. For example, determining whether a deviation in production parameters has occurred may include the choke valve control system 152 assessing the production data 160 to determine whether the value of one or more production parameters for a given point in time deviates more than 10% from a rolling average of values of the parameter over a preceding one hour interval of time. For example, if the production rate of the well 106 has averaged 3,500 STB/day from 1:00 pm-2:00 pm, and the production data 160 indicates a current production rate of the well 106 of 4,000 STB/day at 2:00 pm, it may be determined that there has been a deviation in the production rate of the well 106.

In some embodiments, method 400 includes, in response to determining that a deviation in production parameters has occurred, proceeding to issue an alert for a production parameter deviation (block 406). This may include, transmitting an alert that is indicative of the deviation in one or more production parameters. Continuing with the prior example, issuing an alert for a production parameter deviation may include the choke valve control system 152 sending, to the well control system 122, a corresponding observed parameter alert 190 that is indicative of the current production rate of the well 106 of 4,000 STB/day at 2:00 pm deviating from the rolling average of 3,500 STB/day from 1:00 pm-2:00 pm.

In some embodiments, method 400 includes determining a well profile based on the well production data (block 408). This may include determining a well profile that is indicative of relationships between production flowrates of the well and corresponding choke valve settings. Continuing with the prior example, determining a well profile based on the well production data may include the choke valve control system 152 generating, based on the well production data 160, a well profile 162 that includes, some or all of the sets of associated well conditions (e.g., for each combination of possible well-pressures, well temperatures, water cuts and GORs), a mapping that indicates an estimated flowrate of the well 106 at each of the 11 different settings (e.g., settings 0-10) of the choke valve 150. In some embodiments, the well profile 162 for the well 106 includes a well rate-pressure profile 180 or a well pressure-choke profile 182. For example, determining a well profile based on the well production data may include the choke valve control system 152 generating, based on the well production data 160, a well profile 162 that includes the well rate-pressure profile 180 of FIG. 2 and the well pressure-choke profile 182 of FIG. 3. In some embodiments, the well profile 162 is generated using an artificial neural network (ANN). For example, determining a well profile based on the well production data may include the choke valve control system 152 feeding the production data 160 into an ANN (e.g., an ANN executing locally on the processor 170 of the choke valve control system 152, or executing remotely on a processor of a remote system, such as on a processor the well control system 122) that identifies patterns in the production data 160, and generates corresponding well rate-pressure profiles 180 and well pressure-choke profiles 182 for some or all of the possible sets of well conditions for the well 106.

In some embodiments, method 400 includes determining a target operating parameter for the well (block 410). This may include determining a desired operating parameter, such as a target production rate for the well. For example, determining a target operating parameter for the well may include the choke valve control system 152 receiving, from the well control system 122, a target production rate (e.g., 3,500 STB/day). The target production rate may, for example, be determined by the well control system 122 (or another operator of the well 106) based on an assessment of the well 106, the formation 104, the reservoir 102, or other wells in the reservoir 102.

In some embodiments, method 400 includes determining whether a target operating rate is attainable (block 402). This may include assessing the well profile for a well to determine whether a desired operating parameter, such as a target production rate for the well, is obtainable. For example, determining whether a target operating rate is attainable may include the choke valve control system 152, in response to receiving a target production rate (e.g., 3,500 STB/day), determining, based on the well profile 162 for the well 106, whether the target production rate can be achieved. Referring to FIG. 2, the well rate-pressure profile 180 may be assessed, and if the target production rate is less than or equal to a maximum production rate of the well 106 indicated by the well rate-pressure profile 180 (e.g., the target production rate of 3,500 STB/day is below about 7,800 STB/day), it may be determined that the target production rate is achievable by the well 106. If the target production rate is greater than the maximum production rate of the well rate-pressure profile 180 (e.g., the target production rate is above 7,800 STB/day), it may be determined that the target production rate is not achievable by the well 106. If the target production rate is determined to be achievable based on assessment of the well rate-pressure profile 180, the well pressure-choke profile 182 may be assessed to determine if the wellhead pressure corresponding to the target production rate is achievable. Referring to FIG. 3, if the wellhead pressure corresponding to the target production rate (or "target wellhead pressure") is less than or equal to a maximum wellhead pressure of the well 106 indicated by the well pressure-choke profile 182 (e.g., the target wellhead pressure is below about 4,100 STB/day), it may be determined that the target production rate (and the target wellhead pressure) is achievable by the well 106. If the target wellhead pressure is less than or equal to the maximum wellhead pressure of the well 106 indicated by the well pressure-choke profile 182 (e.g., the target wellhead pressure of 3,000 psi corresponding to the target production rate of 3,500 STB/day is below about 4,100 psi), it may be determined that the target wellhead pressure (and corresponding wellhead pressure) is achievable by the well 106. If the target wellhead pressure is greater than the maximum wellhead pressure of the well 106 indicated by the well pressure-choke profile 182 (e.g., the target wellhead pressure is above 4,100 psi), it may be determined that the target wellhead pressure (and corresponding target production rate) is not achievable by the well 106.

In some embodiments, method 400 includes, in response to determining that a target operating parameter is not obtainable, proceeding to issue an alert for the unobtainable operating parameter (block 414). This may include, transmitting an alert that is indicative of the target operating parameter (e.g., a target production rate) not being obtainable. Continuing with the prior example, if the target production rate is 8,500 STB/day (which is above the maximum production rate of about 7,800 STB/day indicated by the rate-pressure curve of the well rate-pressure profile 180), issuing an alert for an unobtainable operating parameter may include the choke valve control system 152 sending, to the well control system 122, a corresponding target parameter alert 192 that is indicative of the target production rate of the well 106 (e.g., 8,500 STB/day) exceeding an estimated maximum production rate of about 7,800 STB/day.

In some embodiments, the alert is based on a forward looking predictions. For example, if the target production rate is 7,500 STB/day (which is just below the current maximum production rate of about 7,800 STB/day as indicated by the rate-pressure curve of the well rate-pressure profile 180), and the choke valve control system 152 (e.g., the ANN of the choke valve control system 152) generates forward looking modeling that predicts that the well profile 162 will evolve such that the predicted maximum production rate is just less than about 7,500 STB/day in 30 days (and the alert system has a forward looking threshold period of 30 days or more) it may be determined that the target production rate is 7,500 STB/day will not be obtainable at some point during the threshold period, and the choke valve control system 152 may generate (and send to the well control system 122) a corresponding target parameter alert 192 that is indicative of the target production rate of the well 106 (e.g., 7,500 STB/day) being predicted to exceed an estimated maximum production rate in about 30 days. This may enable the choke valve control system 152 (or another operator of the well 106) to take proactive measures to maintain the target production parameters within obtainable ranges. For example, the choke valve control system 152 (or another operator of the well 106) may schedule a reassessment of the target production rate prior to the expiration of the 30 day window, so that the target production rate can be reduced at that time, if needed.

In some embodiments, method 400 includes proceeding to determining a choke setting that corresponds to the target operating parameter (block 416). This may include identifying a choke setting that is expected to enable the well to operate at (or near) the target operating parameter. Continuing with the prior example of the choke valve control system 152 receiving a command to operate at a target production flowrate of 3,500 STB/day (and the choke valve control system 152 determining that the well is operating at the well conditions associated with the illustrated profiles 180 and 182 of FIGS. 2 and 3), the choke valve control system 152 may determine (e.g., using the well rate-pressure profile 180 of FIG. 2) a target WHP of 3,000 psi that corresponds to a target production flowrate of 3,500 STB/day, and determine (e.g., using the well pressure-choke profile 182) a "target" choke valve setting of 5 that corresponds to the target WHP of 3,000 psi. In some embodiments, if the target production parameter is not achievable, the choke setting that provides an operational parameter nearest the target operational parameter may be determined. For example, if the choke valve control system 152 receives a command to operate at a target production flowrate of 8,500 STB/day (and the choke valve control system 152 determines that the well is operating at the well conditions associated with the illustrated profiles 180 and 182 of FIGS. 2 and 3), the choke valve control system 152 may determine (e.g., using the well rate-pressure profile 180 of FIG. 2) a target WHP of 0 psi that corresponds to a target production flowrate of 8,500 STB/day, and determine (e.g., using the well pressure-choke profile 182) a "target" choke valve setting of 10 that provides the minimum WHP.

In some embodiments, method 400 includes operating the choke at the choke setting corresponding to the target operating rate (block 418). This may include the choke valve system controlling the choke valve to operate in the determined choke valve position. Continuing with the prior example of the choke valve control system 152 receiving a command to operate at a target production flowrate of 3,500 STB/day (and the choke valve control system 152 determining that the well is operating at the well conditions associated with the illustrated profiles 180 and 182 of FIGS. 2 and 3), operating the choke at the choke setting corresponding to the target operating rate include the choke valve control system 152 controlling the choke valve 150 to operate in position 5.

In some embodiments, method 300 includes continuing to obtain and assess production data, and making corresponding adjustments to the position of the choke (and issuing alerts) based on the assessment (blocks 402-408). This continual cycle may enable the choke valve system 134 to operate in real-time (e.g., relatively autonomously from the well control system 122) based on a feed of production data 160. The localized operation of the choke valve system 134 may provide a robust and flexible well choke system that is capable of making production parameter assessments and choke adjustments relatively quickly (e.g., without having to relay information and control signals between the choke valve system 134 and the well control system 122). This may enable the choke valve system 134 to make timely adjustments to the choke valve 150 to regulate production fluid flow in an effort to satisfy target operating parameters, such as a target production rate.

Figure 5:
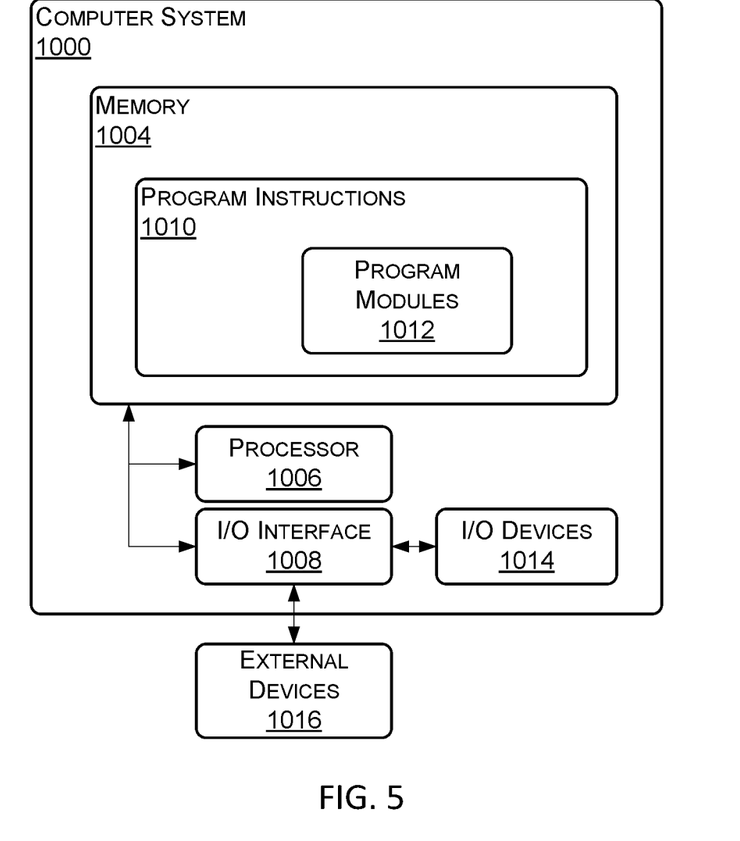
FIG. 5 is a diagram that illustrates an example computer system in accordance with one or more embodiments.

FIG. 5 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (for example, the processor 1006) to cause the functional operations described, such as those described with regard to the well control system 122 (or another operator of the well 106), the choke valve control system 152, or the method 400.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016. In some embodiments, the I/O interface 1008 includes one or both of an antenna and a transceiver. Depending on the context, the external devices 1016 may include, for example, the production sensors 132, the choke valve 150, the choke valve system 134, or the well control system 122.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A hydrocarbon well choke valve system, the choke valve system comprising:
   a choke valve configured to operate at different choke settings to regulate flow of production fluid from a wellbore of a hydrocarbon well; and
   a choke valve control system configured to perform the following operations:
   obtain, from one or more production sensors of the hydrocarbon well, production data that is indicative of characteristics of the operation of the hydrocarbon well, the production data comprising:
      production flowrate data that is indicative of observed values of flowrate of the production fluid obtained by way of a production flowrate sensor of the hydrocarbon well;
      wellhead pressure data that is indicative of observed values of pressure of the production fluid obtained by way of a wellhead pressure sensor of the hydrocarbon well;
      wellhead temperature data that is indicative of observed values of temperature of the production fluid obtained by way of a wellhead temperature sensor of the hydrocarbon well;
      water cut data that is indicative of observed values of water cut of the production fluid obtained by way of a water cut sensor of the hydrocarbon well; and gas-oil-ratio (GOR) data that is indicative of observed values of GOR of the production fluid obtained by way of a GOR sensor of the hydrocarbon well;

generate, based on the production data, a well profile, the well profile being indicative of the flow of production fluid from the wellbore of the hydrocarbon well for each of the different choke settings, and the well profile comprising:
- a well rate-pressure profile that is indicative of a relationship of wellhead pressure of the hydrocarbon well to production rate of the hydrocarbon well; and
- a well pressure-choke profile that is indicative of a relationship of the different choke valve settings to wellhead pressure of the hydrocarbon well;

receive, from a well control system, a target production rate;

determine, based on the well profile for the well, whether the target production rate is obtainable;

in response to determining that the target production rate is obtainable:
- determine, based on the well profile, a choke setting that corresponds to the target production rate, comprising:
  - determining, based on the well rate-pressure profile, a target wellhead pressure that corresponds to the target production rate; and
  - determining, based on the well pressure-choke profile, the choke setting that corresponds to the target wellhead pressure; and
- control the choke valve to operate at the choke setting; and in response to determining that the target production rate is not obtainable:
- communicate, to the well control system, a target rate alert that indicates that the target rate is not obtainable.

2. The system of claim 1, wherein the operations further comprise:

in response to determining that the target production rate is not obtainable:
- determine, based on the well profile, a closest choke setting that corresponds to the target production rate; and
- control the choke valve to operate at the closest choke setting.

3. The system of claim 1, wherein the operations further comprise:

determine, based on the production data, whether an observed production parameter for the well has deviated from historical production parameters for the well; and in response to determining that an observed production parameter for the well has deviated from historical production parameters for the well, communicate, to the well control system, a production parameter alert that indicates that the observed production parameter for the well has deviated from historical production parameters for the well.

4. The system of claim 1, wherein the choke valve control system comprises a local memory, and wherein the well profile is stored on the local memory.

5. The system of claim 1, wherein the operations further comprise:

communicate, to the well control system, the well profile.

6. The system of claim 1, wherein the production data is obtained during operation of the hydrocarbon well and the choke valve is operated in real-time responsive to the obtaining of the production data.

7. A method of operating a hydrocarbon well choke valve system, the method comprising:

operating a choke valve of a hydrocarbon well choke valve system at a choke setting to regulate flow of production fluid from a wellbore of a hydrocarbon well, wherein the choke valve is configured to operate at different choke settings;

obtaining, by a control system of the hydrocarbon well choke valve system from one or more production sensors of the hydrocarbon well, production data that is indicative of characteristics of the operation of the hydrocarbon well, the production data comprising:
- production flowrate data that is indicative of observed values of flowrate of the production fluid obtained by way of a production flowrate sensor of the hydrocarbon well;
- wellhead pressure data that is indicative of observed values of pressure of the production fluid obtained by way of a wellhead pressure sensor of the hydrocarbon well;
- wellhead temperature data that is indicative of observed values of temperature of the production fluid obtained by way of a wellhead temperature sensor of the hydrocarbon well;
- water cut data that is indicative of observed values of water cut of the production fluid obtained by way of a water cut sensor of the hydrocarbon well; and
- gas-oil-ratio (GOR) data that is indicative of observed values of GOR of the production fluid obtained by way of a GOR sensor of the hydrocarbon well;

generating, by the choke valve control system based on the production data, a well profile, the well profile being indicative of the flow of production fluid from the wellbore of the hydrocarbon well for each of the different choke settings, and the well profile comprising:
- a well rate-pressure profile that is indicative of a relationship of wellhead pressure of the hydrocarbon well to production rate of the hydrocarbon well; and
- a well pressure-choke profile that is indicative of a relationship of the different choke valve settings to wellhead pressure of the hydrocarbon well;

receiving, by the choke valve control system from a well control system, a first target production rate;

determining, by the choke valve control system based on the well profile for the well, that the first target production rate is obtainable;

in response to the choke valve control system determining that the first target production rate is obtainable:
- determining, by the choke valve control system based on the well profile, a choke setting that corresponds to the first target production rate, comprising:
  - determining, based on the well rate-pressure profile, a target wellhead pressure that corresponds to the target production rate; and
  - determining, based on the well pressure-choke profile, the choke setting that corresponds to the first target wellhead pressure; and
- controlling, by the choke valve control system, the choke valve to operate at the choke setting;

receiving, by the choke valve control system from the well control system, a second target production rate;

determining, by the choke valve control system based on the well profile for the well, that the second target production rate is not obtainable; and in response to the choke valve control system determining that the second target production rate is not obtainable:

communicating, by the choke valve control system to the well control system, a target rate alert that indicates that the second target rate is not obtainable.

8. The method of claim 7, wherein the method further comprises:

in response to determining that the second target production rate is not obtainable:

determining, by the choke valve control system based on the well profile, a closest choke setting that corresponds to the second target production rate; and controlling, by the choke valve control system, the choke valve to operate at the closest choke setting.

9. The method of claim 7, wherein the method further comprises:

determining, by the choke valve control system based on the production data, that an observed production parameter for the well has deviated from historical production parameters for the well; and in response to the choke valve control system determining that an observed production parameter for the well has deviated from historical production parameters for the well, communicating, by the control system to the well control system, a production parameter alert that indicates that the observed production parameter for the well has deviated from historical production parameters for the well.

10. The method of claim 7, wherein the choke valve control system comprises a local memory, and wherein the method further comprises the choke valve control system storing the well profile on the local memory.

11. The method of claim 7, wherein the method further comprises the choke valve control system communicating the well profile to the well control system.

12. The method of claim 7, wherein the production data is obtained during operation of the hydrocarbon well and the choke valve is operated in real-time responsive to the obtaining of the production data.

13. A non-transitory computer readable storage medium comprising program instructions stored thereon that are executable by a processor to perform the following operations for operating a hydrocarbon well choke valve system:

operating a choke valve of a hydrocarbon well choke valve system at a choke setting to regulate flow of production fluid from a wellbore of a hydrocarbon well, wherein the choke valve is configured to operate at different choke settings;

obtaining, by a control system of the hydrocarbon well choke valve system from one or more production sensors of the hydrocarbon well, production data that is indicative of characteristics of the operation of the hydrocarbon well, the production data comprising:

production flowrate data that is indicative of observed values of flowrate of the production fluid obtained by way of a production flowrate sensor of the hydrocarbon well;

wellhead pressure data that is indicative of observed values of pressure of the production fluid obtained by way of a wellhead pressure sensor of the hydrocarbon well;

wellhead temperature data that is indicative of observed values of temperature of the production fluid obtained by way of a wellhead temperature sensor of the hydrocarbon well;

water cut data that is indicative of observed values of water cut of the production fluid obtained by way of a water cut sensor of the hydrocarbon well; and gas-oil-ratio (GOR) data that is indicative of observed values of GOR of the production fluid obtained by way of a GOR sensor of the hydrocarbon well;

generating, by the choke valve control system based on the production data, a well profile, the well profile being indicative of the flow of production fluid from the wellbore of the hydrocarbon well for each of the different choke settings, and the well profile comprising:

a well rate-pressure profile that is indicative of a relationship of wellhead pressure of the hydrocarbon well to production rate of the hydrocarbon well; and a well pressure-choke profile that is indicative of a relationship of the different choke valve settings to wellhead pressure of the hydrocarbon well;

receiving, by the choke valve control system from a well control system, a first target production rate;

determining, by the choke valve control system based on the well profile for the well, that the first target production rate is obtainable;

in response to the choke valve control system determining that the first target production rate is obtainable:

determining, by the choke valve control system based on the well profile, a choke setting that corresponds to the first target production rate, comprising:

determining, based on the well rate-pressure profile, a target wellhead pressure that corresponds to the first target production rate; and determining, based on the well pressure-choke profile, the choke setting that corresponds to the target wellhead pressure; and controlling, by the choke valve control system, the choke valve to operate at the choke setting;

receiving, by the choke valve control system from the well control system, a second target production rate;

determining, by the choke valve control system based on the well profile for the well, that the second target production rate is not obtainable; and in response to the choke valve control system determining that the second target production rate is not obtainable:

communicating, by the choke valve control system to the well control system, a target rate alert that indicates that the second target rate is not obtainable.

14. The medium of claim 13, wherein the operations further comprise:

in response to determining that the target production rate is not obtainable:

determining, by the choke valve control system based on the well profile, a closest choke setting that corresponds to the target production rate; and controlling, by the choke valve control system, the choke valve to operate at the closest choke setting.

15. The medium of claim 13, wherein the operations further comprise:

determining, by the choke valve control system based on the production data, that an observed production parameter for the well has deviated from historical production parameters for the well; and in response to the choke valve control system determining that an observed production parameter for the well has deviated from historical production parameters for the well, communicating, by the control system to the well control system, a production parameter alert that indicates that the observed production parameter for the well has deviated from historical production parameters for the well.

16. The medium of claim 13, wherein the choke valve control system comprises a local memory, and wherein the operations further comprise the choke valve control system storing the well profile on the local memory.

17. The medium of claim 13, wherein the operations further comprise the choke valve control system communicating the well profile to the well control system.

18. The medium of claim 13, wherein the production data is obtained during operation of the hydrocarbon well and the choke valve is operated in real-time responsive to the obtaining of the production data.

* * * * *